(12) United States Patent
Huang

(10) Patent No.: US 11,516,813 B2
(45) Date of Patent: Nov. 29, 2022

(54) METHOD AND APPARATUS FOR SENDING TRANSMISSION CONFIGURATION INDICATOR, METHOD AND APPARATUS FOR RECEIVING TRANSMISSION CONFIGURATION INDICATOR, STORAGE MEDIUM, BASE STATION, AND TERMINAL

(71) Applicant: SPREADTRUM COMMUNICATIONS (SHANGHAI) CO., LTD., Shanghai (CN)

(72) Inventor: Su Huang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 172 days.

(21) Appl. No.: 15/734,822

(22) PCT Filed: May 30, 2019

(86) PCT No.: PCT/CN2019/089198
§ 371 (c)(1),
(2) Date: Dec. 3, 2020

(87) PCT Pub. No.: WO2019/233334
PCT Pub. Date: Dec. 12, 2019

(65) Prior Publication Data
US 2021/0235452 A1 Jul. 29, 2021

(30) Foreign Application Priority Data
Jun. 7, 2018 (CN) .......................... 201810580903.X

(51) Int. Cl.
*H04W 72/04* (2009.01)
*H04L 5/00* (2006.01)

(52) U.S. Cl.
CPC ....... *H04W 72/0493* (2013.01); *H04L 5/0048* (2013.01); *H04W 72/046* (2013.01)

(58) Field of Classification Search
CPC .......... H04W 72/0493; H04W 72/046; H04W 72/048; H04L 5/0048; H04L 5/0053; H04L 5/0094; H04L 5/0023; H04L 5/0051
See application file for complete search history.

(56) References Cited

U.S. PATENT DOCUMENTS

| 2015/0215908 | A1 | 7/2015 | Seo et al. |
| 2020/0280416 | A1 | 9/2020 | Geo et al. |
| 2021/0337548 | A1* | 10/2021 | Gao ...................... H04L 5/0051 |

FOREIGN PATENT DOCUMENTS

| CN | 104604166 A | 5/2015 |
| CN | 108092754 A | 5/2018 |

(Continued)

OTHER PUBLICATIONS

EPO Extended European Search Report for corresponding EP Application No. 19814176.4; dated Feb. 1, 2022.

(Continued)

*Primary Examiner* — Thai Nguyen
(74) *Attorney, Agent, or Firm* — Cantor Colburn LLP

(57) ABSTRACT

A method and apparatus for transmitting a Transmission Configuration Indicator (TCI), a method and apparatus for receiving a TCI, a storage medium, a base station and a terminal are provided. The method for transmitting a TCI includes: determining a target reference signal, and port groups corresponding to a resource occupied by the target reference signal, wherein large-scale parameters of ports in different port groups are different, for each of the port groups, determining a source reference signal quasi-co-located with the port group, and at least one Quasi-Co-Location (QCL) type of QCLs of the port groups with the (Continued)

source reference signal, to acquire an extended TCI state; and transmitting the extended TCI state and the target reference signal to a UE, so that the UE determines large-scale parameters of the ports for the target reference signal. TCI configuration of multi-panel, multi-Transmission Reference Point (TRP) and multi-beam communication is supported.

20 Claims, 5 Drawing Sheets

(56) References Cited

FOREIGN PATENT DOCUMENTS

| WO | WO-2020141484 A1 * | 7/2020 | ............... H04L 1/08 |
| WO | WO-2020144639 A1 * | 7/2020 | ............. H04B 7/024 |

OTHER PUBLICATIONS

Intel Corporation, "Corrections to QCL for NR", 3GPP TSG RAN WG1 Meeting AH 1801; R1-1800320; Jan. 22-26, 2018; 6 pages.
Samsung, "Remaining details on QCL", 3GPPTSG RAN WG1#91; R1-1720315, Nov. 27-Dec. 1, 2017; 12 pages.
"3rd Generation Partnership Project: Technical Specification Group Radio Access Network; NR; Physical layer procedures for data (Release 15)" 3GPP TS 38.214 V15.1.0, Mar. 2018; 77 pages.
Huawei et al., "Remaining issues and TP for QCL assumptions" 3GPP TSG RAN WG1 Meeting #93 R1-1805961, May 21-25, 2018; 6 pages.
International Search Report for International Application No. PCT/CN2019/089198; dated Aug. 14, 2019.
OPPO, "Text Proposal for QCL" 3GPP TSG RAN WG1 Meeting 93 R1-1806844, Busan, Korea, May 21-25, 2018, 6 pages.

* cited by examiner a target reference signal, and port groups corresponding to a resource occupied by the target reference signal are determined, wherein large-scale parameters of ports in different port groups are different ⟶ S101 for each of the port groups, a source reference signal quasi-co-located with the port group, and at least one QCL type of QCLs of the port groups with the source reference signal are determined, to acquire an extended TCI state ⟶ S102 the extended TCI state and the target reference signal are transmitted to a UE, so that the UE determines large-scale parameters of the ports for the target reference signal ⟶ S103

FIG. 1

METHOD AND APPARATUS FOR SENDING TRANSMISSION CONFIGURATION INDICATOR, METHOD AND APPARATUS FOR RECEIVING TRANSMISSION CONFIGURATION INDICATOR, STORAGE MEDIUM, BASE STATION, AND TERMINAL

CROSS-REFERENCE TO RELATED APPLICATIONS

This is the U.S. national stage of application No. PCT/CN2019/089198, filed on May 30, 2019. Priority under 35 U.S.C. § 119(a) and 35 U.S.C. § 365(b) is claimed from Chinese Application No. 201810580903.X, filed Jun. 7, 2018, the disclosure of which is also incorporated herein by reference.

TECHNICAL FIELD

The present disclosure generally relates to radio communication technology field, and more particularly, to a method and apparatus for transmitting a Transmission Configuration Indicator (TCI), a method and apparatus for receiving a TCI, a storage medium, a base station and a terminal.

BACKGROUND

In a radio communication system, if antenna ports (ports for short) corresponding to resources occupied by two reference signals (RS) are Quasi-Co-Located with respect to a portion of large-scale parameters, it indicates that the portion of large-scale parameters of channels of the two ports are the same. The large-scale parameters may include average gain, average delay, delay spread, Doppler shift, Doppler spread, and spatial receiving parameter.

The Fifth-Generation mobile communications (5G) New Radio (NR) technology introduces a concept of Transmission Configuration Indicator (TCI) to indicate Quasi-Co-Location (QCL). TCI is a list containing multiple elements, and the element in the list can be called TCI state. Different TCI states are expressed in different TCI state formats. Currently, the TCI state format may be a single RS and a single QCL type (for example, {RS1|QCL-Type1}), or two RS and two QCL types (for example, {RS1|QCL-Type1, RS2|QCL-Type2}), where RS1 and RS2 represent source RS of QCL, and QCL-Type1 and QCL-Type2 represent QCL types.

Existing solutions for TCI configuration using TCI state can only serve following communication scenarios: (1) A single target RS and a single source RS are quasi-co-located with respect to large-scale parameters included in a QCL type; (2) a single target RS and a first source RS are quasi-co-located with respect to large-scale parameters included in a first QCL type (for example, QCL-Type1), and the single target RS and a second source RS are quasi-co-located with respect to large-scale parameters included in a second QCL type (for example, QCL-Type2), where the large-scale parameters included in the first QCL type and the large-scale parameters included in the second QCL type do not overlap. However, if the communication scenario of TCI configuration changes, the existing solutions may not be able to provide large-scale parameters that match the target RS.

SUMMARY

Embodiments of the present disclosure provide solutions of how to configure a TCI to support multi-panel, multi-Transmission Reference Point (TRP) and multi-beam communication.

In an embodiment of the present disclosure, a method for transmitting a TCI is provided, including: determining a target reference signal, and port groups corresponding to a resource occupied by the target reference signal, wherein large-scale parameters of ports in different port groups are different; for each of the port groups, determining a source reference signal quasi-co-located with the port group, and at least one QCL type of QCLs of the port groups with the source reference signal, to acquire an extended TCI state; and transmitting the extended TCI state and the target reference signal to a User Equipment (UE), so that the UE determines large-scale parameters of the ports for the target reference signal.

Optionally, the extended TCI state includes a single state, and the single state includes at least two source reference signals and at least one QCL type.

Optionally, the extended TCI state includes two source reference signals and one QCL type.

Optionally, the port groups include group 1 and group 2, and a format of the single state in the extended TCI state is {RS1, RS2|QCL-Type1}, where RS1 and RS2 represent the source reference signals, QCL-Type1 represents the QCL type, the group 1 and RS1 are quasi-co-located with respect to QCL-Type1, and the group 2 and RS2 are quasi-co-located with respect to QCL-Type1.

Optionally, the extended TCI state includes two source reference signals and two QCL types, and large-scale parameters included in the two QCL types at least partially overlap.

Optionally, the port groups include group 1 and group 2, and a format of the extended TCI state is {RS1|QCL-Type1, RS2|QCL-Type2}, wherein RS1 and RS2 represent the source reference signals, QCL-Type1 and QCL-Type2 represent the QCL types, the large-scale parameters included in QCL-Type1 and QCL-Type2 at least partially overlap, group 1 and RS1 are quasi-co-located with respect to QCL-Type1, and group 2 and RS2 are quasi-co-located with respect to QCL-Type2.

Optionally, the extended TCI state includes four source reference signals and two QCL types, and large-scale parameters included in the two QCL types do not overlap.

Optionally, the port groups include group 1 and group 2, and a format of the extended TCI state is {RS1, RS3|QCL-Type1, RS2, RS4|CL-Type2}, where RS1, RS2, RS3 and RS4 represent the source reference signals, QCL-Type1 and QCL-Type2 represent the QCL types, the large-scale parameters included in QCL-Type1 and QCL-Type2 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type1, and group 2 and RS4 are quasi-co-located with respect to QCL-Type2.

Optionally, the extended TCI state includes four source reference signals and four QCL types, and for the four QCL types, large-scale parameters included in the first two QCL types do not overlap, and large-scale parameters included in the last two QCL types do not overlap.

Optionally, the port groups include group 1 and group 2, and a format of the extended TCI state is {RS1|CL-Type1, RS2|QCL-Type2, RS3|QCL-Type3, RS4|QCL-Type4}, where RS1, RS2, RS3 and RS4 represent the source reference signals, and QCL-Type1, QCL-Type2, QCL-Type3 and QCL-Type4 represent the QCL types, the large-scale parameters included in QCL-Type1 and QCL-Type2 do not overlap, the large-scale parameters included in QCL-Type3 and QCL-Type4 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type3, and group 2 and RS4 are quasi-co-located with respect to QCL-Type4.

Optionally, the extended TCI state includes at least two states, the number of the states is the same as the number of the port groups corresponding to the resource occupied by the target reference signal, and each state records the source reference signal and the QCL type.

Optionally, a format of each state is selected from a group consisting of IRS1|CL-Type1 and {RS2|QCL-Type2, RS3|QCL-Type3}, wherein RS1, RS2 and RS3 represent the source reference signals, QCL-Type1, QCL-Type2 and QCL-Type3 represent the QCL types, and large-scale parameters included in QCL-Type2 and QCL-Type3 do not overlap.

Optionally, for each port group, if a format of the state of the port group is {RS1|CL-Type1}, the port group and RS1 are quasi-co-located with respect to QCL-Type1; and if the format of the state of the port group is {RS2|CL-Type2, RS3|CL-Type3}, the port group and RS2 are quasi-co-located with respect to QCL-Type2, and the port group and RS3 are quasi-co-located with respect to QCL-Type3.

Optionally, determining port groups corresponding to a resource occupied by the target reference signal includes: for ports corresponding to the resource occupied by the target reference signal, determining the ports of a same transmission link as a same port group.

Optionally, QCL types of the ports in different port groups are different.

Optionally, the QCL type is selected from a group consisting of QCL-TypeA, QCL-TypeB, QCL-TypeC and QCL-TypeD.

In an embodiment of the present disclosure, a method for receiving a TCI is provided, including: receiving an extended TCI state and a target reference signal from a network; determining, based on the target reference signal, port groups corresponding to a resource occupied by the target reference signal, wherein large-scale parameters of ports in different port groups are different; and determining large-scale parameters of the ports for the target reference signal based on the extended TCI state, wherein the extended TCI state includes source reference signals quasi-co-located with the port groups, and at least one QCL type of QCLs of the port groups with each of the source reference signals.

Optionally, the extended TCI state includes a single state, and the single state includes at least two source reference signals and at least one QCL type.

Optionally, the extended TCI state includes two source reference signals and one QCL type.

Optionally, the port groups include group 1 and group 2, and a format of the single state in the extended TCI state is {RS1, RS2|QCL-Type1}, where RS1 and RS2 represent the source reference signals, QCL-Type1 represents the QCL type, the group 1 and RS1 are quasi-co-located with respect to QCL-Type1, and the group 2 and RS2 are quasi-co-located with respect to QCL-Type1.

Optionally, the extended TCI state includes two source reference signals and two QCL types, and large-scale parameters included in the two QCL types at least partially overlap.

Optionally, the port groups include group 1 and group 2, and a format of the extended TCI state is {RS1|QCL-Type1, RS2|QCL-Type2}, wherein RS1 and RS2 represent the source reference signals, QCL-Type1 and QCL-Type2 represent the QCL types, the large-scale parameters included in QCL-Type1 and QCL-Type2 at least partially overlap, group 1 and RS1 are quasi-co-located with respect to QCL-Type1, and group 2 and RS2 are quasi-co-located with respect to QCL-Type2.

Optionally, the extended TCI state includes four source reference signals and two QCL types, and large-scale parameters included in the two QCL types do not overlap.

Optionally, the port groups include group 1 and group 2, and a format of the extended TCI state is {RS1, RS3|QCL-Type1, RS2, RS4|CL-Type2}, where RS1, RS2, RS3 and RS4 represent the source reference signals, QCL-Type1 and QCL-Type2 represent the QCL types, the large-scale parameters included in QCL-Type1 and QCL-Type2 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type1, and group 2 and RS4 are quasi-co-located with respect to QCL-Type2.

Optionally, the extended TCI state includes four source reference signals and four QCL types, and for the four QCL types, large-scale parameters included in the first two QCL types do not overlap, and large-scale parameters included in the last two QCL types do not overlap.

Optionally, the port groups include group 1 and group 2, and a format of the extended TCI state is {RS1|CL-Type1, RS2|QCL-Type2, RS3|QCL-Type3, RS4|QCL-Type4}, where RS1, RS2, RS3 and RS4 represent the source reference signals, and QCL-Type1, QCL-Type2, QCL-Type3 and QCL-Type4 represent the QCL types, the large-scale parameters included in QCL-Type1 and QCL-Type2 do not overlap, the large-scale parameters included in QCL-Type3 and QCL-Type4 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type3, and group 2 and RS4 are quasi-co-located with respect to QCL-Type4.

Optionally, the extended TCI state includes at least two states, the number of the states is the same as the number of the port groups corresponding to the resource occupied by the target reference signal, and each state records the source reference signal and the QCL type.

Optionally, a format of each state is selected from a group consisting of {RS1|CL-Type1} and {RS2|QCL-Type2, RS3|QCL-Type3}, wherein RS1, RS2 and RS3 represent the source reference signals, QCL-Type1, QCL-Type2 and QCL-Type3 represent the QCL types, and large-scale parameters included in QCL-Type2 and QCL-Type3 do not overlap.

Optionally, for each port group, if a format of the state of the port group is {RS1|CL-Type1}, the port group and RS1 are quasi-co-located with respect to QCL-Type1; and if the format of the state of the port group is {RS2|CL-Type2, RS3|QCL-Type3}, the port group and RS2 are quasi-co-located with respect to QCL-Type2, and the port group and RS3 are quasi-co-located with respect to QCL-Type3.

Optionally, determining port groups corresponding to a resource occupied by the target reference signal includes: for ports corresponding to the resource occupied by the target reference signal, determining the ports of a same reception link as a same port group.

Optionally, QCL types of the ports in different port groups are different.

Optionally, the QCL type is selected from a group consisting of QCL-TypeA, QCL-TypeB, QCL-TypeC and QCL-TypeD.

In an embodiment of the present disclosure, an apparatus for transmitting a TCI is provided, including: a first determining circuitry configured to determine a target reference signal, and port groups corresponding to a resource occupied by the target reference signal, wherein large-scale parameters of ports in different port groups are different; a second determining circuitry configured to: for each of the port groups, determine a source reference signal quasi-co-located with the port group, and at least one QCL type of QCLs of the port groups with the source reference signal, to acquire an extended TCI state; and a transmitting circuitry configured to transmit the extended TCI state and the target reference signal to a UE, so that the UE determines large-scale parameters of the ports for the target reference signal.

In an embodiment of the present disclosure, an apparatus for receiving a TCI is provided, including: a receiving circuitry configured to receive an extended TCI state and a target reference signal from a network; a third determining circuitry configured to determine, based on the target reference signal, port groups corresponding to a resource occupied by the target reference signal, wherein large-scale parameters of ports in different port groups are different; and a fourth determining circuitry configured to determine large-scale parameters of the ports for the target reference signal based on the extended TCI state, wherein the extended TCI state includes source reference signals quasi-co-located with the port groups, and at least one QCL type of QCLs of the port groups with each of the source reference signals.

In an embodiment of the present disclosure, a storage medium having computer instructions stored therein is provided, wherein when the computer instructions are executed, the above method for transmitting a TCI or the above method for receiving a TCI is performed.

In an embodiment of the present disclosure, a base station including a memory and a processor is provided, wherein the memory has computer instructions stored therein, and when the processor executes the computer instructions, the above method for transmitting a TCI is performed.

In an embodiment of the present disclosure, a terminal including a memory and a processor is provided, wherein the memory has computer instructions stored therein, and when the processor executes the computer instructions, the above method for receiving a TCI is performed.

Embodiments of the present disclosure may provide following advantages.

Embodiments of the present disclosure provide a method for transmitting a TCI, including: determining a target reference signal, and port groups corresponding to a resource occupied by the target reference signal, wherein large-scale parameters of ports in different port groups are different; for each of the port groups, determining a source reference signal quasi-co-located with the port group, and at least one QCL type of QCLs of the port groups with the source reference signal, to acquire an extended TCI state; and transmitting the extended TCI state and the target reference signal to a UE, so that the UE determines large-scale parameters of the ports for the target reference signal. With the embodiments, association of some ports with the TCI state is supported. Even if the large-scale parameters of each port corresponding to the resource occupied by the target reference signal are different, the UE can still learn the large-scale parameters of each port of the target reference signal, which supports TCI configuration of multi-panel, multi-TRP and multi-beam communication.

Further, the port groups include group 1 and group 2, and a format of the single state in the extended TCI state is {RS1, RS2|QCL-Type1}, where RS1 and RS2 represent the source reference signals, QCL-Type1 represents the QCL type, the group 1 and RS1 are quasi-co-located with respect to QCL-Type1, and the group 2 and RS2 are quasi-co-located with respect to QCL-Type1. With the embodiments, TCI configuration may be provided for more communication scenarios, and QCL of the port group with the source reference signal, thereby making QCL configuration more flexible.

Further, the extended TCI state includes at least two states, the number of the states is the same as the number of the port groups corresponding to the resource occupied by the target reference signal, and each state records the source reference signal and the QCL type. With the embodiments, the same number of states as the port groups may be provided to perform TCI configuration on the ports in each port group, thereby achieving flexible TCI configuration.

BRIEF DESCRIPTION OF THE DRAWINGS

FIG. 1 is a flow chart of a method for transmitting a TCI according to an embodiment;

DETAILED DESCRIPTION

Figure 2:
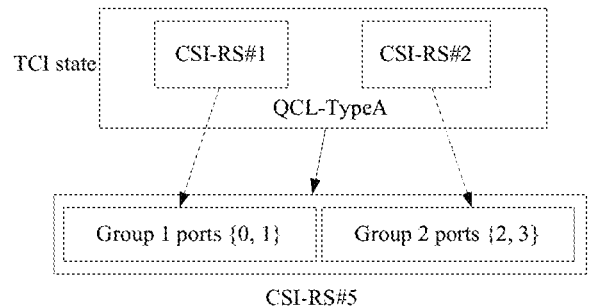
FIG. 2 is a diagram of a relation between a TCI state and a target RS according to an embodiment.

As described in the background, existing solutions for TCI configuration using TCI state can only serve limited communication scenarios.

QCL types defined by 5G standards are as follows: (1) a large-scale parameter combination included in QCL-TypeA contains average delay, delay spread, Doppler shift and Doppler spread; (2) a large-scale parameter combination included in QCL-TypeB contains Doppler shift and Doppler spread; (3) a large-scale parameter combination included in QCL-TypeC contains average delay and Doppler shift; and (4) a large-scale parameter combination included in QCL-TypeD contains a spatial receiving parameter.

If a TCI state is associated with a target RS, it indicates that a source RS and the target RS are quasi-co-located with respect to large-scale parameters in a QCL type. For example, the 5G standards support the TCI state {TRS #2|QCL-TypeB} and it is associated with a target Channel State Information Reference Signal (CSI-RS). In this case, the source RS TRS #2 and the CSI-RS are quasi-co-located with respect to the large-scale parameters included in QCL-TypeB.

For another example, the 5G standards support the TCI state {TRS #2|QCL-TypeA, CSI-RS #5|QCL-TypeD}, and it is associated with DMRS of Physical Downlink Shared CHannel (PDSCH). In this case, TRS #2 and the DMRS are quasi-co-located with respect to the large-scale parameters included in QCL-TypeA, and CSI-RS #5 and the DMRS are quasi-co-located with respect to the large-scale parameters included in QCL-TypeD.

The inventor found that large-scale characteristics of a port channel configured by a target RS can be calculated and determined by large-scale characteristics of a port channel configured by a source RS. For example, a UE may determine that a port configured by a source CSI-RS and a port configured by a target Demodulation Reference Signal (DMRS) are quasi-co-located based on QCL configuration information from a base station. For another example, the UE may determine that a port configured by a source CSI-RS and a port configured by a target CRS are quasi-co-located based on QCL configuration information from the base station.

At present, although the QCL information based on TCI is configured based on a level of an RS resource, ports in the RS resource are actually configured. For example, two reference signals being quasi-co-located with respect to a QCL type refers to any two ports in the two RS resources are quasi-co-located with respect to the QCL type.

When there are multi-panel, multi-TRP or multi-beam, each RS resource may be divided into multiple port groups, and each port group includes one or more ports. Take two port groups as an example. In this case, port group 1 (referred to as group 1 for short) may be quasi-co-located with a source RS with respect to some large-scale parameters, and group 2 may be quasi-co-located with another source RS with respect to some other large-scale parameters. However, existing TCI state configuration solutions cannot support the association of some ports with a TCI state.

Embodiments of the present disclosure provide a method for transmitting a TCI, including: determining a target reference signal, and port groups corresponding to a resource occupied by the target reference signal, wherein large-scale parameters of ports in different port groups are different; for each of the port groups, determining a source reference signal quasi-co-located with the port group, and at least one QCL type of QCLs of the port groups with the source reference signal, to acquire an extended TCI state; and transmitting the extended TCI state and the target reference signal to a UE, so that the UE determines large-scale parameters of the ports for the target reference signal. With the embodiments, association of some ports with the TCI state is supported. Even if the large-scale parameters of each port corresponding to the resource occupied by the target reference signal are different, the UE can still learn the large-scale parameters of each port of the target reference signal, which supports TCI configuration of multi-panel, multi-TRP and multi-beam communication.

In order to clarify the objects, characteristics and advantages of the disclosure, embodiments of present disclosure will be described in detail in conjunction with accompanying drawings.

FIG. 1 is a flow chart of a method for transmitting a TCI according to an embodiment. The method may be applied at a network side, e.g., performed by a base station at the network side. Referring to FIG. 1, the method may include S101, S102 and S103.

In S101, a target reference signal, and port groups corresponding to a resource occupied by the target reference signal are determined, wherein large-scale parameters of ports in different port groups are different.

In S102, for each of the port groups, a source reference signal quasi-co-located with the port group, and at least one QCL type of QCLs of the port groups with the source reference signal are determined, to acquire an extended TCI state.

In S103, the extended TCI state and the target reference signal are transmitted to a UE, so that the UE determines large-scale parameters of the ports for the target reference signal.

In some embodiments, in S101, the base station may determine with respect to which large-scale parameters ports corresponding to a resource occupied by the source reference signal (hereinafter referred to as the ports of the source reference signal) and ports corresponding to a resource occupied by the target reference signal (hereinafter referred to as the ports of the target reference signal) are quasi co-located.

In some embodiments, the base station may determine the target reference signal, and further determine the ports corresponding to the resource occupied by the target reference signal. If there are differences in large-scale parameters of the ports of the target reference signal, after the target reference signal is determined, the base station may determine the port groups corresponding to the resource occupied by the target reference signal (hereinafter referred to as the port groups of the target reference signal), where the large-scale parameters of the ports in different port groups are different. For example, in a multi-panel, multi-TRP and multi-beam communication scenario, the ports corresponding to the resource occupied by the target reference signal may be divided into multiple port groups, and the large-scale parameters of the ports in different port groups may be different.

In some embodiments, the port groups may include two port groups, being group 1 and group 2, respectively.

In some embodiments, the ports of a same transmission link may be determined as a same port group. For example, the base station may use two transmission beams to simultaneously transmit a same Physical Downlink Control Channel (PDCCH) for one UE, and the two transmission beams correspond to two different transmission links. The two transmission beams may be carried by different reference signals. In this case, the ports of the same transmission link may be added to the same port group, and the large-scale parameters of each port in the port group are the same. On the contrary, the large-scale parameters of the ports in different port groups are different.

In S102, after the port groups of the target reference signal are determined, the base station may determine the extended TCI state, so that each port group is associated with the determined TCI state. That is, the base station may determine, for each port group, the source RS that is quasi-co-located with the port group, and a QCL type of each port in the port group with each port of the source reference signal.

In some embodiments, the extended TCI state may include a single state. The extended TCI state may include at least two source reference signals and at least one QCL type.

In some embodiments, the extended TCI state may include two source reference signals and a QCL type, and each source reference signal corresponds to the QCL type. For example, a format of the single state in the extended TCI state is {RS1, RS2|QCL-Type1}. RS1 and RS2 represent source reference signals, and may be DMRS or CSI-RS. QCL-Type1 represents the QCL type, which may be one of QCL-TypeA, QCL-TypeB, QCL-TypeC and QCL-TypeD. Those skilled in the art could understand that the format of the single state in the extended TCI state may be {RS1 RS2, QCL-Type1}, { RS1 RS2; QCL-Type1}, { RS1; RS2|QCL- Type1} or others that can indicate each source reference signal has a one-to-one correspondence with a QCL type.

Take the port group of the target reference signal including group 1 and group 2 as an example. If the format of the extended TCI state is {RS1, RS2|QCL-Type1}, it indicates that group 1 and RS1 are quasi-co-located with respect to QCL-Type1, group 2 and RS2 are quasi-co-located with respect to QCL-Type1. That is, when the extended TCI state is associated with the target RS, if the format of the extended TCI state is {RS1, RS2|QCL-Type1}, it indicates that each port in group 1 and each port in RS1 are quasi-co-located with respect to the large-scale parameters in QCL-Type1, and each port in group 2 and each port in RS2 are quasi-co-located with respect to the large-scale parameters in QCL-Type1.

FIG. 2 is a diagram of a relation between a TCI state and a target RS according to an embodiment. Referring to FIG. 2, a format of the TCI state is {CSI-RS #1, CSI-RS #2|QCL-TypeA}. The target RS is CSI-RS #5. The number of ports is 4, and the ports are divided into 2 groups. Group 1 includes port 0 and port 1, and group 2 includes port 2 and port 3. When CSI-RS #5 is associated with the TCI state, port 0 and port 1 of CSI-RS #5 and CSI-RS #1 are quasi-co-located with respect to QCL-TypeA, and port 2 and port 3 of CSI-RS #5 and CSI-RS #2 are quasi-co-located with respect to QCL-TypeA.

In some embodiments, the extended TCI state may include two source reference signals and two QCL types, where one source reference signal corresponds to one QCL type, and the other source reference signal corresponds to the other QCL type. The large-scale parameters contained in the two QCL types at least partially overlap. For example, a format of a single state in the extended TCI state is {RS1|QCL-Type1, RS2|QCL-Type2}, where RS1 and RS2 represent source reference signals, and may be DMRS or CSI-RS. QCL-Type1 and QCL-Type2 represent QCL types, and at least a portion of the large-scale parameters of QCL-Type1 and QCL-Type2 may be the same. In addition, QCL-Type1 and QCL-Type2 may be QCL-TypeA, QCL-TypeB, QCL-TypeC or QCL-TypeD. Those skilled in the art could understand that the format of the single state in the extended TCI state may be {RS1 RS2, QCL-Type1 QCL-Type2}, { RS1 RS2; QCL-Type1 QCL-Type2}, { RS1; RS2|QCL-Type1; QCL-Type2}, { RS1|QCL-Type1; RS2|CL-Type2} or other formats that can indicate a one-to-one correspondence between a single source reference signal and a single QCL type.

Still take the port group of the target reference signal including group 1 and group 2 as an example. If the format of the extended TCI state is {RS1|CL-Type1, RS2|QCL-Type2}, it indicates that group 1 and RS1 are quasi-co-located with respect to QCL-Type1, group 2 and RS2 are are quasi-co-located with respect to QCL-Type2. That is, when the extended TCI state is associated with the target RS, if the format of the extended TCI status is {RS1|QCL-Type1, RS2|QCL-Type2}, it indicates that each port in group 1 and each port in RS1 are quasi-co-located with respect to the large-scale parameters in QCL-Type1, and each port in group 2 and each port in RS2 are quasi-co-located with respect to the large-scale parameters in QCL-Type2.

In some embodiments, the extended TCI state may include four source reference signals and two QCL types, every two source reference signals correspond to one QCL type, and large-scale parameters included in the two QCL type do not overlap. For example, a format of a single state in the extended TCI state is {RS1, RS3|CL-Type1, RS2, RS4|CL-Type2}, where RS1, RS2, RS3 and RS4 represent source reference signals, and may be DMRS, or CSI-RS, QCL-Type1 and QCL-Type2 represent QCL types. The large-scale parameters contained in QCL-Type1 and QCL-Type2 are completely different. QCL-Type1 and QCL-Type2 may be QCL-TypeA, QCL-TypeB, QCL-TypeC or QCL-TypeD. Those skilled in the art could understand that the format of the single state in the extended TCI state is {RS1, RS3|QCL-Type1; RS2, RS4|QCL-Type2}, { RS1, RS3, QCL-Type1, RS2, RS4, QCL-Type2}, { RS1 RS3|QCL-Type1, RS2 RS4|QCL-Type2}, { RS1, RS3, QCL-Type1; RS2, RS4, QCL-Type2} or other formats that can indicate that every two source reference signals correspond to a QCL type.

Still take the port group corresponding to the resource occupied by the target reference signal including group 1 and group 2 as an example. If the format of the extended TCI state is {RS1, RS3|CL-Type1, RS2, RS4|QCL-Type2}, it indicates that group 1 and RS1 are quasi-co-located with respect to QCL-Type1, and group 1 and RS2 is quasi-co-located with respect to QCL-Type2, group 2 and RS3 are quasi-co-located with respect to QCL-Type1, and group 2 and RS4 are quasi-co-located with respect to QCL-Type2. That is, when the extended TCI state is associated with the target RS, if the format of the extended TCI state is {RS1, RS3|QCL-Type1, RS2, RS4|QCL-Type2}, it indicates that each port in group 1 and each port in RS1 are quasi-co-located with respect to the large-scale parameters in QCL-Type1, and each port in group 1 and each port in RS2 are quasi-co-located with respect to the large-scale parameters in QCL-Type2, each port in group 2 and each port in RS3 are quasi-co-located with respect to the large-scale parameters in QCL-Type1, and each port in group 2 and each port in RS4 are quasi-co-located with respect to the large-scale parameters in QCL-Type2.

In some embodiments, the extended TCI state may include four source reference signals and four QCL types, and each source reference signal corresponds to one QCL type. For the four QCL types, large-scale parameters contained in the first two QCL types do not overlap, and large-scale parameters contained in the last two QCL types do not overlap. That is, when the extended TCI state is associated with the target RS, if the format of the extended TCI state is {RS1|QCL-Type1, RS2|QCL-Type2, RS3|QCL-Type3, RS4|QCL-Type4}, where RS1, RS2, RS3 and RS4 represent source reference signals, QCL-Type1, QCL-Type2, QCL-Type3 and QCL-Type4 represent QCL types. Large-scale parameters included in QCL-Type1 and QCL-Type2 The are completely different, and large-scale parameters included in QCL-Type3 and QCL-Type4 are completely different. QCL-Type1, QCL-Type2, QCL-Type3 and QCL-Type4 may be QCL-TypeA, QCL-TypeB, QCL-TypeC or QCL-TypeD. Those skilled in the art could understand that the format of a single state in the extended TCI state is {RS1, QCL-Type1, RS2, QCL-Type2, RS3, QCL-Type3, RS4, QCL-Type4}, { RS1|QCL-Type1; RS2|QCL-Type2; RS3|QCL-Type3; RS4|QCL-Type4}, { RS1 QCL-Type1, RS2 QCL-Type2, RS3 QCL-Type3, RS4 QCL-Type4}, { RS1 QCL-Type1; RS2 QCL-Type2; RS3 QCL-Type3; RS4 QCL-Type4} or other formats that can indicate that the four source reference signals respectively correspond to the four QCL types.

Still take the port group corresponding to the resource occupied by the target reference signal including group 1 and group 2 as an example. If a format of the extended TCI state is {RS1|QCL-Type1, RS2|QCL-Type2, RS3|QCL-Type3, RS4|QCL-Type4}, it indicates that the large-scale parameters contained in each port in group 1 and the large-scale parameters contained in each port in RS1 are the same with respect to QCL-Type1, and the large-scale parameters contained in each port in group 1 and the large-scale parameters contained in each port in RS2 are the same with respect to QCL-Type2, the large-scale parameters contained in each port in group 2 and the large-scale parameters contained in each port in RS3 are the same with respect to QCL-Type3, and the large-scale parameters contained in each port in group 2 and the large-scale parameters contained in each port in RS4 are the same with respect to QCL-Type4.

Figure 3:
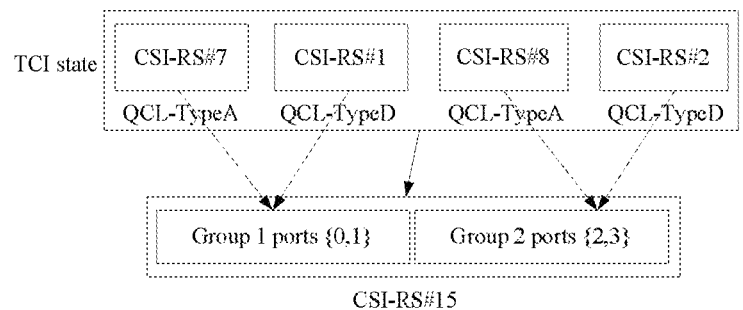
FIG. 3 is a diagram of a relation between a TCI state and a target RS according to an embodiment.

FIG. 3 is a diagram of a relation between a TCI state and a target RS according to an embodiment. Referring to FIG. 3, a format of the TCI state is {CSI-RS #7|QCL-TypeA, CSI-RS #1|QCL-TypeD, CSI #8|QCL-TypeA, CSI-RS #2|QCL-TypeD}. The target RS is CSI-RS #15, the number of ports is 4, and the ports are divided into 2 groups, where group 1 includes port 0 and port 1, and group 2 includes port 2 and port 3. When CSI-RS #15 is associated with the TCI state, port 0 and port 1 of CSI-RS #15 and CSI-RS #7 are quasi-co-located with respect to QCL-TypeA, port 0 and port 1 of CSI-RS #15 and CSI-RS #1 are quasi-co-located with respect to QCL-TypeD, port 2 and port 3 of CSI-RS #15 and CSI-RS #8 are quasi-co-located with respect to QCL-TypeA, and port 2 and port 3 of CSI-RS #15 and CSI-RS #2 are quasi-co-located with respect to QCL-TypeD.

Alternatively, the extended TCI state may include two or more states, and the number of the states may be the same as the number of the port groups corresponding to resource occupied by the target reference signal, where each state may include the source reference signal and the QCL type.

In some embodiments, a format of each state may be {RS1|QCL-Type1} or {RS2|QCL-Type2, RS3|QCL-Type3}, where RS1, RS2 and RS3 represent source reference signals, and may be DMRS or CSI-RS. QCL-Type1, QCL-Type2 and QCL-Type3 represent QCL types. Large-scale parameters contained in QCL-Type2 and QCL-Type3 are completely different. QCL-Type1, QCL-Type2 and QCL-Type3 may be QCL-TypeA, QCL-TypeB, QCL-TypeC or QCL-TypeD.

Further, if the ports of the target reference signal can be divided into M port groups, for the i-th port group, if the format of the TCI state corresponding to the i-th port group is {RS1|CL-Type1}, the i-th port group and RS1 are quasi-co-located with respect to QCL-Type1; and if the format of the TCI state corresponding to the i-th port group is {RS2|QCL-Type2, RS3|QCL-Type3}, the i-th port group and RS2 are quasi-co-located with respect to QCL-Type2, and the i-th port group and RS3 are quasi-co-located with respect to QCL-Type3, where M is a positive integer greater than or equal to 2, i is greater than or equal to 1, and less than or equal to M.

Still take the port group of the target reference signal including group 1 and group 2 as an example. If the format of the extended TCI state is {RS1|CL-Type1}, {RS2|QCL-Type2, RS3|CL-Type3}, it indicates that large-scale parameters included in each port in group 1 and large-scale parameters included in each port in RS1 are the same with respect to QCL-Type1, large-scale parameters included in each port in group 2 and large-scale parameters included in RS2 are the same with respect to QCL-Type2, and large-scale parameters included in each port in group 2 and large-scale parameters included in each port in RS3 are the same with respect to QCL-Type3.

Figure 4:
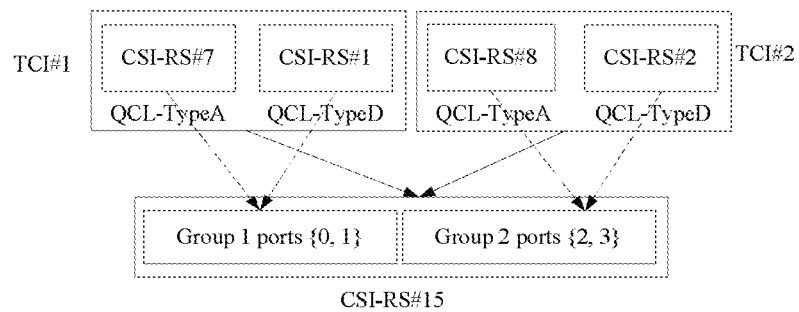
FIG. 4 is a diagram of a relation between a TCI state and a target RS according to an embodiment.

FIG. 4 is a diagram of a relation between a TCI state and a target RS according to an embodiment. Referring to FIG. 4, the TCI state includes two states TCI #1 and TCI #2. A format of the state TCI #1 is {CSI-RS #7|QCL-TypeA, CSI-RS #1|QCL-TypeD}, and a format of the state TCI #2 is {CSI-RS #8|QCL-TypeA, CSI-RS #2|QCL-TypeD}. The target RS is CSI-RS #15, the number of ports is 4, and the ports are divided into 2 groups, where group 1 includes port 0 and port 1, and group 2 includes port 2 and port 3. When CSI-RS #15 is associated with state TCI #1 and state TCI #2, port 0 and port 1 of CSI-RS #15 and CSI-RS #7 are quasi-co-located with respect to QCL-TypeA, and port 0 and port 1 of CSI-RS #15 and CSI-RS #1 are quasi-co-located with respect to QCL-TypeD, port 2 and port 3 of CSI-RS #15 and CSI-RS #8 are quasi-co-located with respect to QCL-TypeA, and port 2 and port 3 of CSI-RS #15 and CSI-RS #2 are quasi-co-located with respect to QCL-TypeD.

Figure 5:
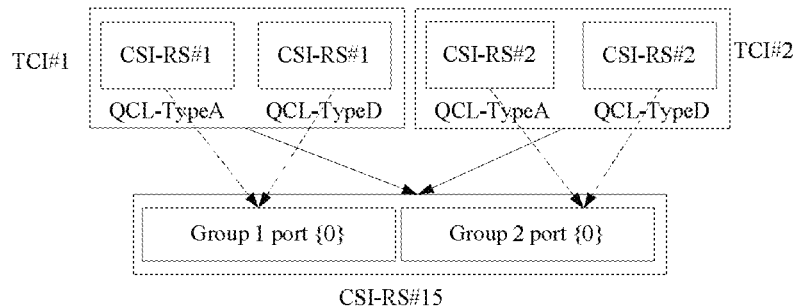
FIG. 5 is a diagram of a relation between a TCI state and a target RS according to an embodiment.

FIG. 5 is a diagram of a relation between a TCI state and a target RS according to an embodiment. Referring to FIG. 5, the TCI state includes two states TCI #1 and TCI #2. A format of the state TCI #1 is {CSI-RS #1|QCL-TypeA, CSI-RS #1|QCL-TypeD}, and a format of the state TCI #2 is {CSI-RS #2|QCL-TypeA, CSI-RS #2|QCL-TypeD}. The target RS is PDCCH DMRS, and the number of ports is 1. In this case, although the target RS has only a single port, it can be included in both group 1 and group 2. Group 1 and CSI-RS #1 are quasi-co-located with respect to QCL-TypeA, and group 1 and CSI-RS #2 are quasi-co-located with respect to QCL-TypeD.

In S103, the base station may transmit the extended TCI state and the target reference signal to the UE explicitly. Alternatively, the base station may implicitly transmit the extended TCI state and the target reference signal to the UE. After receiving the extended TCI state and the target reference signal, the UE can learn large-scale parameters included in each port in the target reference signal according to the source reference signals and the QCL types included in the extended TCI state.

In some embodiments, referring to FIG. 5, when the base station uses two transmission links (for example, two transmission beams) to transmit a PDCCH simultaneously, due to the existence of spatial reception parameter configuration information (that is, the existence of QCL-TypeD), the two transmission beams may be carried by CSI-RS #1 and CSI-RS #2, respectively. Accordingly, the UE may use two panels to receive the PDCCH. The two panels may form two independent receiving beams corresponding to different downlink reception links. For example, the first reception link receives the transmission beam carried by CSI-RS #1, indicating that the received PDCCH DMRS and CSI-RS #1 are quasi-co-located with respect to QCL-TypeA. The second reception link receives the transmission beam carried by CSI-RS #2, indicating that the received PDCCH DMRS and CSI-RS #2 are quasi-co-located with respect to QCL-TypeA. In this way, the UE can learn the large-scale parameters of the ports corresponding to the two reception links.

Figure 6:
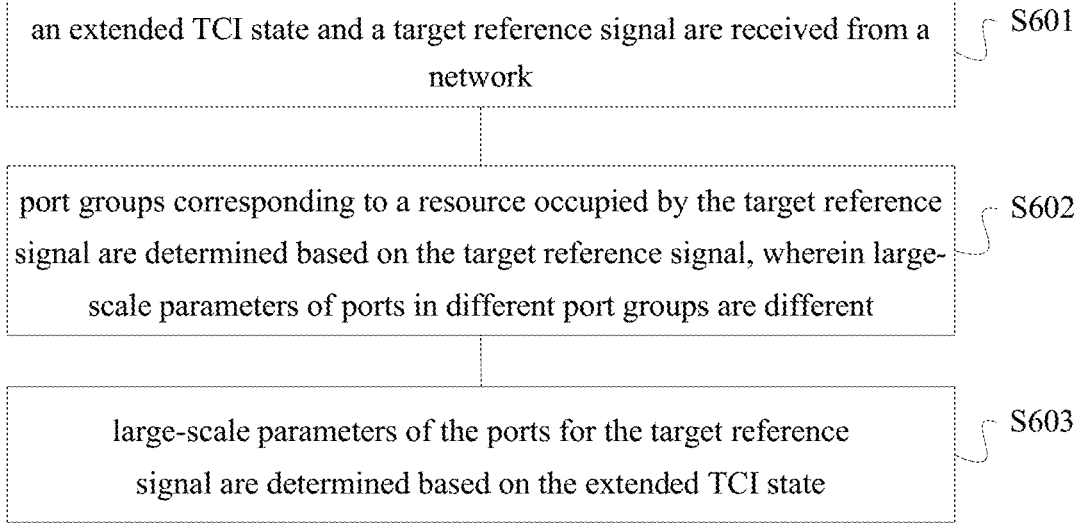
FIG. 6 is a flow chart of a method for receiving a TCI according to an embodiment.

FIG. 6 is a flow chart of a method for receiving a TCI according to an embodiment. The method may be applied at a UE. Referring to FIG. 6, the method may include S601, S602 and S603.

In S601, an extended TCI state and a target reference signal are received from a network.

In S602, port groups corresponding to a resource occupied by the target reference signal are determined based on the target reference signal, wherein large-scale parameters of ports in different port groups are different.

In S603, large-scale parameters of the ports for the target reference signal are determined based on the extended TCI state.

The extended TCI state includes source reference signals quasi-co-located with the port groups, and at least one QCL type of QCLs of the port groups with each of the source reference signals.

In S601, the UE may explicitly or implicitly receive the extended TCI state and the target reference signal from the network.

In S602, based on the target reference signal, the UE may determine the port groups corresponding to the resource occupied by the target reference signal. In some embodiments, for the ports corresponding to the resource occupied by the target reference signal, the UE may determine the ports belonging to the same reception link as the same port group. The QCL types of the ports in different port groups are different, for example, the large-scale parameters of the ports in different port groups are different.

In S603, the UE may determine the large-scale parameters of each port in the target reference signal based on the extended TCI state. The extended TCI state includes source reference signals quasi-co-located with the port groups, and at least one QCL type of QCLs of the port groups with each of the source reference signals. The QCL type may be one of the following: QCL-TypeA, QCL-TypeB, QCL-TypeC or QCL-TypeD. It should be noted that each port group may be quasi-co-located with a single source RS with respect to some large-scale parameters, or may be quasi-co-located with multiple source RS with respect to some large-scale parameters. When there are multiple port groups, the source RS quasi-co-located with each port group may be generally different.

In some embodiments, the extended TCI state includes a single state, and the single state includes at least two source reference signals and at least one QCL type.

In some embodiments, the extended TCI state includes two source reference signals and one QCL type.

In some embodiments, the port groups include group 1 and group 2, and a format of the single state in the extended TCI state is {RS1, RS2|QCL-Type1}, where RS1 and RS2 represent the source reference signals, QCL-Type1 represents the QCL type, the group 1 and RS1 are quasi-co-located with respect to QCL-Type1, and the group 2 and RS2 are quasi-co-located with respect to QCL-Type1.

In some embodiments, the extended TCI state includes two source reference signals and two QCL types, and large-scale parameters included in the two QCL types at least partially overlap.

In some embodiments, the port groups include group 1 and group 2, and a format of the extended TCI state is {RS1|CL-Type1, RS2|QCL-Type2}, wherein RS1 and RS2 represent the source reference signals, QCL-Type1 and QCL-Type2 represent the QCL types, the large-scale parameters included in QCL-Type1 and QCL-Type2 at least partially overlap, group 1 and RS1 are quasi-co-located with respect to QCL-Type1, and group 2 and RS2 are quasi-co-located with respect to QCL-Type2.

In some embodiments, the extended TCI state includes four source reference signals and two QCL types, and large-scale parameters included in the two QCL types do not overlap.

In some embodiments, the port groups include group 1 and group 2, and a format of the extended TCI state is {RS1, RS3|QCL-Type1, RS2, RS4|QCL-Type2}, where RS1, RS2, RS3 and RS4 represent the source reference signals, QCL-Type1 and QCL-Type2 represent the QCL types, the large-scale parameters included in QCL-Type1 and QCL-Type2 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type1, and group 2 and RS4 are quasi-co-located with respect to QCL-Type2.

In some embodiments, the extended TCI state includes four source reference signals and four QCL types, and for the four QCL types, large-scale parameters included in the first two QCL types do not overlap, and large-scale parameters included in the last two QCL types do not overlap.

In some embodiments, the port groups include group 1 and group 2, and a format of the extended TCI state is {RS1|QCL-Type1, RS2|QCL-Type2, RS3|QCL-Type3, RS4|CL-Type4}, where RS1, RS2, RS3 and RS4 represent the source reference signals, and QCL-Type1, QCL-Type2, QCL-Type3 and QCL-Type4 represent the QCL types, the large-scale parameters included in QCL-Type1 and QCL-Type2 do not overlap, the large-scale parameters included in QCL-Type3 and QCL-Type4 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type3, and group 2 and RS4 are quasi-co-located with respect to QCL-Type4.

In some embodiments, the extended TCI state includes at least two states, the number of the states is the same as the number of the port groups corresponding to the resource occupied by the target reference signal, and each state records the source reference signal and the QCL type.

In some embodiments, a format of each state is selected from a group consisting of {RS1|QCL-Type1} and {RS2|QCL-Type2, RS3|QCL-Type3}, wherein RS1, RS2 and RS3 represent the source reference signals, QCL-Type1, QCL-Type2 and QCL-Type3 represent the QCL types, and large-scale parameters included in QCL-Type2 and QCL-Type3 do not overlap. In some embodiments, for each port group, if a format of the state of the port group is {RS1|QCL-Type1}, the port group and RS1 are quasi-co-located with respect to QCL-Type1; and if the format of the state of the port group is {RS2|QCL-Type2, RS3|QCL-Type3}, the port group and RS2 are quasi-co-located with respect to QCL-Type2, and the port group and RS3 are quasi-co-located with respect to QCL-Type3.

Those skilled in the art could understand that S601 to S603 correspond to S101 to S103 in the embodiment as shown in FIG. 1, and specific implementation principles and logic of S601 to S606 are complementary to those of S101 to S103. Therefore, more details about the method applied on the UE may be referred to related descriptions of the embodiments as shown in FIG. 1 to FIG. 5, and are not described here.

Figure 7:
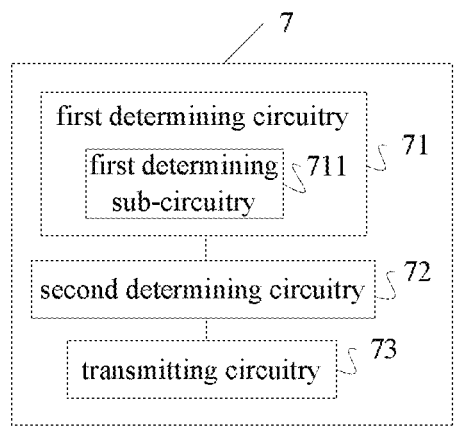
FIG. 7 is a structural diagram of an apparatus for transmitting a TCI according to an embodiment.

FIG. 7 is a structural diagram of an apparatus for transmitting a TCI according to an embodiment. The apparatus 7 may be applied at a network side, and is configured to perform the method as shown in FIG. 1 to FIG. 5.

In some embodiments, the apparatus 7 includes: a first determining circuitry 71 configured to determine a target reference signal, and port groups corresponding to a resource occupied by the target reference signal, wherein large-scale parameters of ports in different port groups are different; a second determining circuitry 72 configured to: for each of the port groups, determine a source reference signal quasi-co-located with the port group, and at least one QCL type of QCLs of the port groups with the source reference signal, to acquire an extended TCI state; and a transmitting circuitry 73 configured to transmit the extended TCI state and the target reference signal to a UE, so that the UE determines large-scale parameters of the ports for the target reference signal.

In some embodiments, the first determining circuitry 71 may include a first determining sub-circuitry 711 configured to: for ports corresponding to the resource occupied by the target reference signal, determine the ports of a same transmission link as a same port group.

More details of working principles and working modes of the apparatus 7 can be found in the above descriptions of FIG. 1 to FIG. 5, and are not described here.

Figure 8:
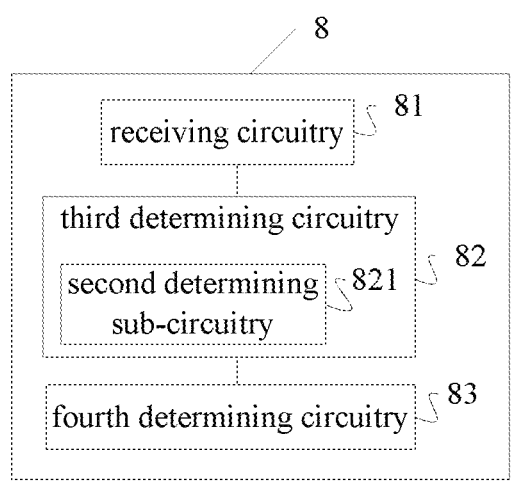
FIG. 8 is a structural diagram of an apparatus for receiving a TCI according to an embodiment.

FIG. 8 is a structural diagram of an apparatus for receiving a TCI according to an embodiment. The apparatus 8 may be applied at a UE, and is configured to perform the method as shown in FIG. 2 to FIG. 6.

In some embodiments, the apparatus 8 includes: a receiving circuitry 81 configured to receive an extended TCI state and a target reference signal from a network; a third determining circuitry 82 configured to determine, based on the target reference signal, port groups corresponding to a resource occupied by the target reference signal, wherein large-scale parameters of ports in different port groups are different; and a fourth determining circuitry 83 configured to determine large-scale parameters of the ports for the target reference signal based on the extended TCI state, wherein the extended TCI state includes source reference signals quasi-co-located with the port groups, and at least one QCL type of QCLs of the port groups with each of the source reference signals.

In some embodiments, the third determining circuitry 82 may include a second determining sub-circuitry 821 configured to: for ports corresponding to the resource occupied by the target reference signal, determining the ports of a same reception link as a same port group.

More details of working principles and working modes of the apparatus 8 can be found in the above descriptions of FIG. 2 to FIG. 6, and are not described here.

Hereinafter, signaling interaction between a UE and a network (e.g., an NR base station) according to an embodiment is described in conjunction with typical application scenarios.

Figure 9:
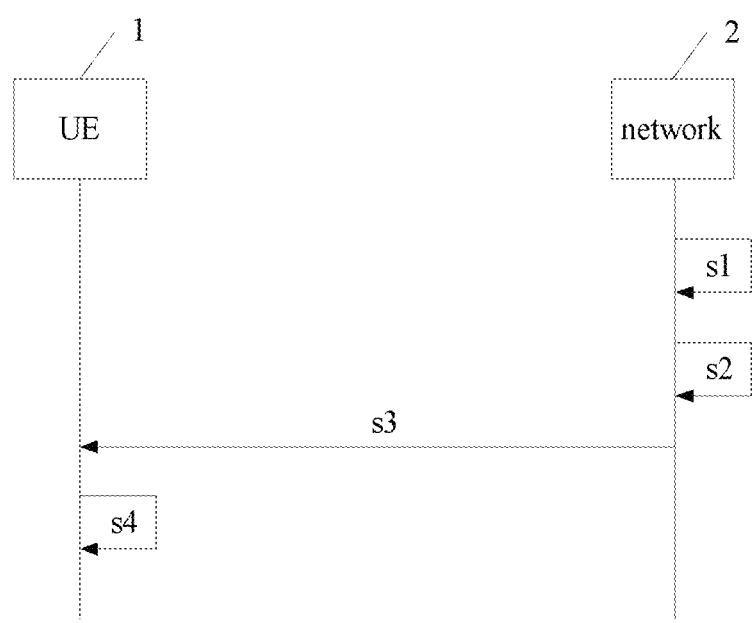
FIG. 9 is a diagram of a typical application scenario according to an embodiment.

Referring to FIG. 9, in an application scenario, during DCI transmission between the UE 1 and the network 2, following steps may be performed.

First, the network 2 performs s1, that is, the network 2 determines a target reference signal. If there are differences in large-scale parameters of ports of the target reference signal, after the target reference signal is determined, the network 2 may determine port groups corresponding to a resource occupied by the target reference signal, where the large-scale parameters of the ports in different port groups are different.

Afterward, the network 2 performs s2, that is, for each of the port groups, the network 2 determines a source reference signal quasi-co-located with the port group, and at least one QCL type of QCLs of the port groups with the source reference signal, to acquire an extended TCI state.

Afterward, the network 2 performs s3, that is, the network 2 transmits the extended TCI state and the target reference signal to the UE 1, so that the UE 1 determines large-scale parameters of the ports for the target reference signal.

Afterward, the UE 1 performs s4, that is, the UE 1 receives the extended TCI state and the target reference signal, determines the port groups based on the target reference signal, and determines large-scale parameters of the ports in each port group based on the source reference signals and the QCL types included in the extended TCI state.

More details of working principles and working modes of the UE 1 and the network 2 in the application scenario as shown in FIG. 9 can be found in the above descriptions of FIG. 1 to FIG. 6, and are not described here.

In an embodiment of the present disclosure, a storage medium having computer instructions stored therein is provided, wherein when the computer instructions are executed, any one of the above methods as shown in FIG. 1 to FIG. 6 is performed. The storage medium may include a computer readable storage medium. The storage medium may include a Read Only Memory (ROM), a Random Access Memory (RAM), a magnetic disk or an optical disk.

In an embodiment of the present disclosure, a base station including a memory and a processor is provided, wherein the memory has computer instructions stored therein, and when the processor executes the computer instructions, the above method as shown in FIG. 1 to FIG. 5 is performed. The base station may be an NR base station.

In an embodiment of the present disclosure, a terminal including a memory and a processor is provided, wherein the memory has computer instructions stored therein, and when the processor executes the computer instructions, the above method as shown in FIG. 2 to FIG. 6 is performed. In some embodiments, the base station may interact with the UE. In some embodiments, the terminal may be a UE.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for transmitting a Transmission Configuration Indicator (TCI), comprising:
    determining a target reference signal, and port groups corresponding to a resource occupied by the target reference signal, wherein large-scale parameters of ports in different port groups are different;
    for each of the port groups, determining a source reference signal quasi-co-located with the port group, and at least one Quasi-Co-Location (QCL) type of QCLs of the port groups with the source reference signal, to acquire an extended TCI state; and
    transmitting the extended TCI state and the target reference signal to a User Equipment (UE), so that the UE determines large-scale parameters of the ports for the target reference signal.

2. A method for receiving a Transmission Configuration Indicator (TCI), comprising:
    receiving an extended TCI state and a target reference signal from a network;
    determining, based on the target reference signal, port groups corresponding to a resource occupied by the target reference signal, wherein large-scale parameters of ports in different port groups are different; and
    determining large-scale parameters of the ports for the target reference signal based on the extended TCI state, wherein the extended TCI state comprises source reference signals quasi-co-located with the port groups, and at least one Quasi-Co-Location (QCL) type of QCLs of the port groups with each of the source reference signals.

3. The method according to claim 2, wherein the extended TCI state comprises a single state, and the single state comprises at least two source reference signals and at least one QCL type.

4. The method according to claim 3, wherein the extended TCI state comprises two source reference signals and one QCL type.

5. The method according to claim 4, wherein the port groups comprise group 1 and group 2, and a format of the single state in the extended TCI state is {RS1, RS2|QCL-Type1}, where RS1 and RS2 represent the source reference signals, QCL-Type1 represents the QCL type, the group 1 and RS1 are quasi-co-located with respect to QCL-Type1, and the group 2 and RS2 are quasi-co-located with respect to QCL-Type1.

6. The method according to claim 3, wherein the extended TCI state comprises two source reference signals and two QCL types, and large-scale parameters included in the two QCL types at least partially overlap.

7. The method according to claim 6, wherein the port groups comprise group 1 and group 2, and a format of the extended TCI state is {RS1|QCL-Type1, RS2|QCL-Type2}, wherein RS1 and RS2 represent the source reference signals, QCL-Type1 and QCL-Type2 represent the QCL types, the large-scale parameters included in QCL-Type1 and QCL-Type2 at least partially overlap, group 1 and RS1 are quasi-co-located with respect to QCL-Type1, and group 2 and RS2 are quasi-co-located with respect to QCL-Type2.

8. The method according to claim 3, wherein the extended TCI state comprises four source reference signals and two QCL types, and large-scale parameters included in the two QCL types do not overlap.

9. The method according to claim 8, wherein the port groups comprise group 1 and group 2, and a format of the extended TCI state is {RS1, RS3|QCL-Type1, RS2, RS4|QCL-Type2}, where RS1, RS2, RS3 and RS4 represent the source reference signals, QCL-Type1 and QCL-Type2 represent the QCL types, the large-scale parameters included in QCL-Type 1 and QCL-Type2 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type1, and group 2 and RS4 are quasi-co-located with respect to QCL-Type2.

10. The method according to claim 3, wherein the extended TCI state comprises four source reference signals and four QCL types, and for the four QCL types, large-scale parameters included in the first two QCL types do not overlap, and large-scale parameters included in the last two QCL types do not overlap.

11. The method according to claim 10, wherein the port groups comprise group 1 and group 2, and a format of the extended TCI state is {RS1|QCL-Type1, RS2|QCL-Type2, RS3|QCL-Type3, RS4|QCL-Type4}, where RS1, RS2, RS3 and RS4 represent the source reference signals, and QCL-Type1, QCL-Type2, QCL-Type3 and QCL-Type4 represent the QCL types, the large-scale parameters included in QCL-Type1 and QCL-Type2 do not overlap, the large-scale parameters included in QCL-Type3 and QCL-Type4 do not overlap, group 1 and RS1 are quasi-co-located with respect to QCL-Type1, group 1 and RS2 are quasi-co-located with respect to QCL-Type2, group 2 and RS3 are quasi-co-located with respect to QCL-Type3, and group 2 and RS4 are quasi-co-located with respect to QCL-Type4.

12. The method according to claim 2, wherein the extended TCI state comprises at least two states, the number of the states is the same as the number of the port groups corresponding to the resource occupied by the target reference signal, and each state records the source reference signal and the QCL type.

13. The method according to claim 12, wherein a format of each state is selected from a group consisting of {RS1|QCL-Type1} and {RS2|QCL-Type2, RS3|QCL-Type3}, wherein RS1, RS2 and RS3 represent the source reference signals, QCL-Type1, QCL-Type2 and QCL-Type3 represent the QCL types, and large-scale parameters included in QCL-Type2 and QCL-Type3 do not overlap.

14. The method according to claim 13, wherein for each port group, if a format of the state of the port group is {RS1|CL-Type1}, the port group and RS1 are quasi-co-located with respect to QCL-Type1; and if the format of the state of the port group is {RS2|QCL-Type2, RS3|QCL-Type3}, the port group and RS2 are quasi-co-located with respect to QCL-Type2, and the port group and RS3 are quasi-co-located with respect to QCL-Type3.

15. The method according to wherein determining port groups corresponding to a resource occupied by the target reference signal comprises: for ports corresponding to the resource occupied by the target reference signal, determining the ports of a same reception link as a same port group.

16. An apparatus for receiving a Transmission Configuration Indicator (TCI), comprising:
a receiving circuitry configured to receive an extended TCI state and a target reference signal from a network;
a third determining circuitry configured to determine, based on the target reference signal, port groups corresponding to a resource occupied by the target reference signal, wherein large-scale parameters of ports in different port groups are different; and
a fourth determining circuitry configured to determine large-scale parameters of the ports for the target reference signal based on the extended TCI state,
wherein the extended TCI state comprises source reference signals quasi-co-located with the port groups, and at least one Quasi-Co-Location (QCL) type of QCLs of the port groups with each of the source reference signals.

17. A non-transitory storage medium having computer instructions stored therein, wherein when the computer instructions are executed, the method of claim 1 is performed.

18. A base station comprising a memory and a processor, wherein the memory has computer instructions stored therein, and when the processor executes the computer instructions, the method of claim 1 is performed.

19. A terminal comprising a memory and a processor, wherein the memory has computer instructions stored therein, and when the processor executes the computer instructions, the method of claim 2 is performed.

20. A non-transitory storage medium having computer instructions stored therein, wherein when the computer instructions are executed, the method of claim 2 is performed.

* * * * *